INVENTOR.
PETER F. JOHNSON
BY
D. M. Maffapelle
ATTORNEY.

April 7, 1970 P. F. JOHNSON 3,504,795
WATER SLUDGE SEPARATION SYSTEM AND METHOD

Filed July 7, 1969 2 Sheets-Sheet 2

INVENTOR.
PETER F. JOHNSON
BY
ATTORNEY.

United States Patent Office 3,504,795
Patented Apr. 7, 1970

3,504,795
WATER SLUDGE SEPARATION SYSTEM AND METHOD
Peter Frederick Johnson, Sanderstead, Surrey, England, assignor to Dorr-Oliver Incorporated, Stamford, Conn., a corporation of Delaware
Filed July 7, 1969, Ser. No. 839,418
Int. Cl. C02c 3/00
U.S. Cl. 210—83    9 Claims

ABSTRACT OF THE DISCLOSURE

Process and apparatus for removing water bands which form during the thickening of sludges, particularly sawage sludge, but which remain interspersed between the layers of stratified sludge. The apparatus comprises a tank divided into at least two compartments by a substantially vertical perforate partition through which the aforesaid water bands are controllably removed.

---

In treating sewage and the like, it is a common practice first to thicken them by holding them some hours or days in tanks in order to release free water. During this detention, the various components of a sludge will often separate by force of gravity into distinctive layers; for example, a top layer of floating sludge or scum beneath which water zones or bands and sludge are interspersed.

Although effective separation may have been attained, these water bands make it difficult to take out concentrated sludge. If the sludge is withdrawn from the bottom of the tank, water may be accidentally entrained as soon as the descending water bands approach the sludge outlet. Scum cannot usually be taken out until the separated water is removed, necessitating switching the withdrawn materials to different destinations to avoid remixing of the separated water. Similar objections spoil the process if it be attempted to decant or overflow the water layer by pumping in more sludge. Scum of unknown depth is the first component overflowing and this may have formed a high proportion of the total sludge for thickening.

To counter these objections, various movable draw off devices have been made comprising, for example, outlet pipes adjustable in height and swivelling search arms for withdrawing water from a certain range of depth. These devices have assisted in removing a proportion of the separated water prior to withdrawal of the thickened sludge and scum. Their disadvantages include their inability to draw off all the water without also drawing sludge or scum; their dependance upon sliding or rotating surfaces which are adversely affected by immersion in the sludge; and the necessity for constant care in operation to maintain them at the changing draw off height when arms and water layers are invisible beneath the scum.

This invention avoids these disadvantages and forms instead an automatic system for removing separated water while preventing sludge and scum entrainment, using properties of thickened sludge and water as its principle of operation without need for human aid.

Alternate "fill and draw" is favored by most operators as providing thickened sludge with cleaner water and less risk of holding dregs of undischarged material liable to undergo eventual fermentation. The invention is especially suitable for sludge consolidation tanks which operate by "fill and draw" and less so to thickeners working with continuous feed and discharge, but consolidation tanks containing mechanisms to aid the separation by slow stirring or to move the sludge across the floor towards a sump or outlet can be readily adapted to the system of this invention.

In accordance with this invention, there is provided a process and apparatus for dewatering sludges comprising a tank having impervious bottom and side walls and divided into at least two compartments by a subsantially vertical perforate partition defining a sludge compartment and a liquid draw off compartment. Sludge to be thickened and support liquid are controllably fed into their respective compartments at a rate so that the level of sludge and support liquid rises at substantially the same rate. After thickening has occurred, liquid is controllably withdrawn from the draw off compartment while the sludge level is maintained substantially constant. As the liquid level in the draw off compartment drops, the water bands in the sludge compartment flow through the partition into draw off compartment. The operation is continued until substantially all the water bands are removed. Thereafter the thickened sludge is removed and the cycle renewed.

In order that it may be clearly understood and readily carried into effect, the invention will now be described by way of example. With reference to the accompanying drawings, in which.

Figure 1:
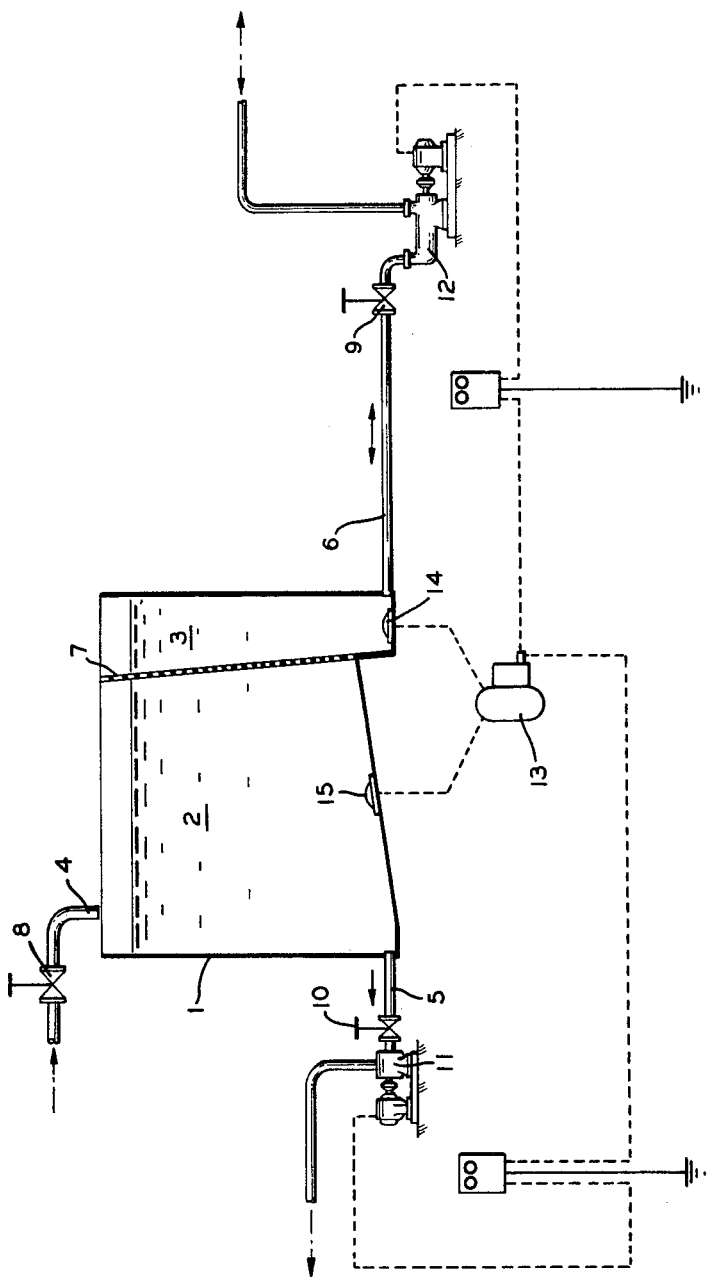
FIG. 1 is a sectional view of the sludge consolidation system of this invention.
Figure 2:
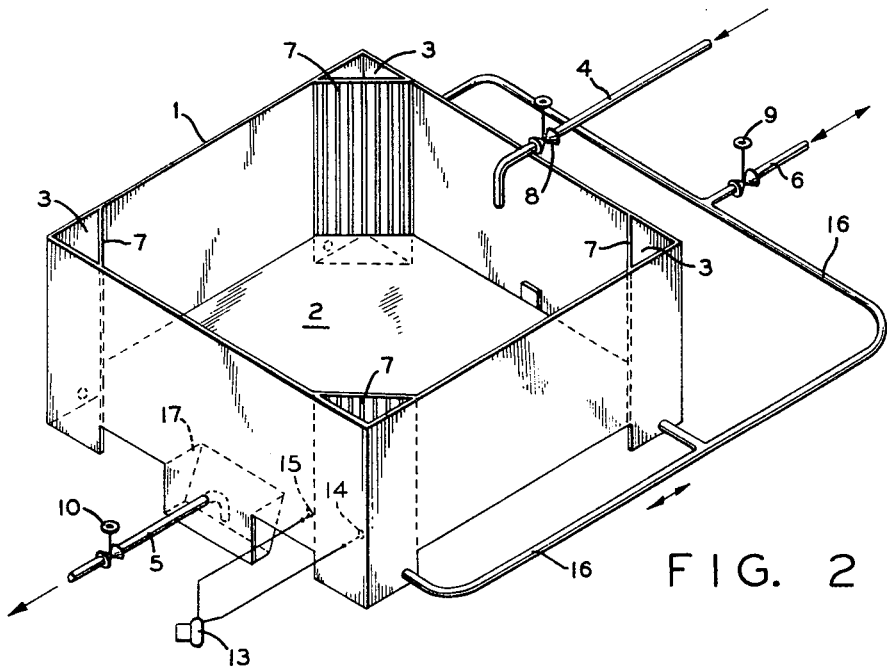
FIG. 2 is a plan view of a square consolidation tank of this invention and showing fill and draw off conduits.

Referring now to FIG. 1, a sludge consolidation tank 1 is divided into two or more compartments shown at 2 and 3. Compartment 2 receives the thin sludge feed by way of a pipe 4, discharging the material when thickened through pipe 5, while separated water can be drawn off from compartment 3 by way of a pipeline 6. The compartments are divided from each other by a perforate partition 7. If several water outlets are employed, as shown in FIG. 2, then each must be protected by a similar partition and each water draw off chamber thus defined would have an area small compared with sludge compartment 2.

It is a feature of this invention that partitions must be vertical or nearly so, to intersect all water layers which may form within the body of the sludge. It is preferred however that, in order to reduce adhesion of the thickened sludge when drawing off, partitions should be slightly tilted say at 5°–10° from vertical to cause the top edge to project into compartment 2 and slightly overhang the base.

In contrast to the prior art, the sludge consolidation tank of this invention requires impervious floor and walls save only for the sludge and water discharge openings therein, together with the perforate partition set for sideways flow instead of downwardly directed filtering.

It is a further requirement of this invention that chamber 3 be fed with water while the chamber 2 is fed with sludge, so as to support the sludge against the perforate partition 7 and prevent its ingress to compartment 3. For this same purpose it is also necessary that, in batchwise operation, water in compartment 3 shall rise or fall in level at the same rate as the sludge in chamber 2.

Means for feeding sludge are unimportant to the thickening process and are not shown in the drawings. Discharge of the separate products can be carried out by pumping or, in certain circumstances, hydrostatic head might be employed. However, in order to comply with the above requirement, the respective flow rates must be controllable. To this end, there are shown a valve at 8 for regulating the sludge feed, another valve at 9 for regulating flows of water and a third at 10 to regulate the flow of thickened sludge. These valves would be motorised if discharge were to be attained by hydrostatic head, but pumps for sludge and water are depicted in the drawings respectively at 11 and 12 since these would be more usually employed. When pumping, hand-adjusted valves could be provided since initial setting only would be needed.

The necessary correlation between sludge and liquid levels would occur so long as:

$$\frac{\text{Liquid Feed Rate}}{\text{Sludge Feed Rate}} = \frac{\text{Area of Compartment 3}}{\text{Area of Compartment 2}}$$

Thus, while feeding is in progress, if the liquid were delivered at a fixed flow rate, then regulation of the sludge supply alone would satisfy requirements. It will be readily seen that these conditions can be attained by any one of several well known means. A preferred embodiment, as shown in FIG. 1, is a single pump at 12. Pump 12 can pump in the supporting liquid and, when thickening is finished, can be used for pumping out the water by reversal of its drive. This obviates the need for double pumps or for a complex of expensive automatic valves to change direction of the flow. Two-speed operation, rapid during feeding of the sludge and slower during decantation of the water, can be readily provided and the drive can be controlled by automatic switching in a manner to be now described.

Hand initiation of the sludge supply would normally be needed since availability of sludge for thickening is not usually predictable. For situations where the sludge is fed by gravity, sensing elements of diverse kinds may be obtained for causing the remaining process steps to follow in due course. The sensing elements are arranged to start the pump 12 as soon as feed sludge starts to flow. For pumped delivery of feed, the starters of both sludge and water pumps would be connected so that closure of one switch would start them both, a time delay device retarding start-up of the sludge pump to ensure the prior entry of supporting water. When the thickener is filled the pumps would be shut off.

Duration of the thickening or water separating step could be controlled by time clock if required. This normally would not be needed; rather would it be the custom to allow the sludge to stay in storage to await demands. In this case, discharge of thick sludge and water would be started off by hand and therefore FIG. 1 does not depict a timer. Initial action to commence discharge would be the starting of pump 12 in such direction as to pump out water from compartment 3.

On starting decantation thus, the different properties of sludge and water are exploited to assist removal of the products in an automatic way. This is achieved by lowering the level in compartment 3 while not immediately withdrawing sludge from 2. When level drops a small amount in 3, water bands in 2 flow into 3 with greater ease than would the viscous sludge which is retarded by partition 7. While the water bands are flowing sideways into 3 and lessening in thickness, sludge and scum continue moving downwards and the water sideways until water bands in 2 have disappeared. When this occurs and scum and sludge rest on each other, further level drop in 3 will cause a larger level differential to appear between the two compartments. By acting on a differential sensing element, this difference is employed to start removal of the thickened sludge.

A preferred level differential level switch is diagrammatically shown at 13 with its probes at 14 and at 15 situated in the water and the sludge respectively.

This switch can be adjusted to be unresponsive at a 2″ differential which would be sufficient for the sideways movement of the water bands. On further level drop in 3 when water ceases to flow in, say at 1 ft. level difference, it would switch the sludge pump on. Sludge and water pumps would operate thereafter simultaneously, their previously adjusted rates of draw-down being equal to maintain the differential to the end.

During draw-down, further sideways water drainage into 3 could be expected though this would, with thickened sludge in 2, be very slow. The switch can cope with this disturbing factor since it can be adjusted to switch off the sludge pump only when the differential disappears. Given that pump 12 withdraws the water faster than it is replenished from compartment 2, the sludge pump would not prematurely stop.

Since sludge pump operation will continue only while the levels are unequal, differential level must persist until all sludge and water have been taken out. The floor of chamber 3 must therefore be below the floor of 2 in order to maintain the right conditions to the end.

Partition 7 is preferably a wedge wire screen having its wires set with their broader sides towards the sludge. In order to reduce adhesion of the thickened sludge while drawing off, it is advisable to orient the screen wires in an up and down direction rather than to place them horizontally.

Partition 7 can span the side walls of a tank, as shown in FIG. 1. Alternatively, the wire screen can be applied as tubes of square, triangular or circular cross-section fitted into tanks of any size or shape. If more than one compartment 3 is formed, then pipes or ducts should be provided to connect the several water draw-off chambers with each other and maintain a common level.

Figure 3:
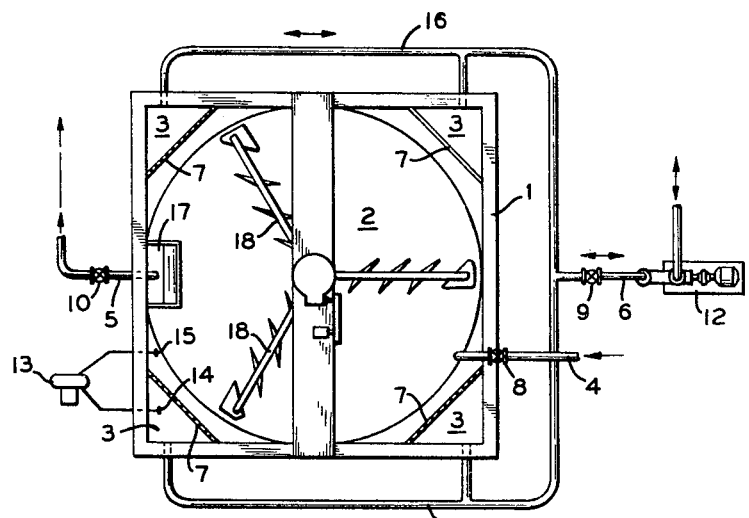
FIG. 3 is a modification of the consolidation tank of FIG. 2 incorporating raking mechanism for moving thickened sludge on the tank floor.

A preferred embodiment for use in tanks equipped with scraper mechanisms is shown in FIG. 3. Here, the sludge feed pipe is shown at 4 to enter a square thickening tank 2 equipped with raking mechanism 18 having blades to rake the sludge across the flat or gently sloping floor. The sludge discharge pipe 5 leaves from a sump 17, here shown beneath one side wall of the tank. With suitably directed rakes, it could of course be situated centrally if so desired. Four separate compartments 3 are formed by fixing the partitions 7 across the corners of the tank, thereby avoiding need for corner scraping mechanisms or corner fillets. Water outlet 6 is common to the four compartments, joining each to all the others by the pipes 16. Thereby, water is drawn equally from each compartment and a common level is established so a single water probe is shown at 14 to control the switch 13.

Operation of the apparatus of this invention is essentially a cyclic process comprising four steps, namely; filling, settling, water draw-off and sludge withdrawal.

During filling, sludge is fed into compartment 2 through pipe 4 while water enters from pump 12 through pipe 6 to compartment 3. Flow rates to said compartments are controlled by valves 8 and 9 so that the level in compartments 2 and 3 rises at equal rates thus preventing the sludge from flowing into compartment 3.

Settling may be by batch operation but stirring and/or raking mechanisms are preferably provided in compartment 2. Usually the water separates in layers interspersed with sludge which makes removal difficult.

Water draw-off is effected by pump 12. Pump 12 is started in reverse drawing water from compartment 3 lowering the level therein relative to the level of sludge in compartment 2. At about 1 to 2 inch level difference the water bands in compartment 2 flow sideways through partition 7 into compartment 3 and the sludge in compartment 2 descends to take their place. Partition 7 allows free flow through of water but retards the flow of viscous sludge in compartment 2.

Finally, when the water bands have been displaced to compartment 3 sludge is withdrawn by pump 11 through pipe 5. Pump 11 may be activated by a differential level switch 13 which detects the drop in water level in compartment 3 through sensor 14. At a predetermined differential, for example 1 ft., sludge pump 11 is activated and the thickened sludge flows out of compartment 2 through pipe 5 at a rate controlled by valve 10 to keep an equal rate of fall in compartments 2 and 3 until the cycle is completed.

The invention has been now described in terms of sewage sludge with water for support. However, use need not be thus restricted but, with suitable adjustments to sizes of the unit parts, the principles can be applied to other slurries. Use of water in compartment 3 is likewise not obligatory and, in certain cases, benefit might be derived from use of other liquids such as oil, even if they differ from the liquid to be drawn out from the sludge.

What is claimed is:

1. Apparatus for dewatering sludges comprising; a tank having an impervious bottom and side walls and divided into at least two compartments by a substantially vertical perforate partition defining a sludge compartment and a liquid draw-off compartment, first conduit means for controllably feeding sludge to be thickened to said sludge compartment, second conduit means for feeding support liquid to said draw-off compartment, control means for correlating the rate at which sludge and support liquid are fed into their respective compartments, and discharge means for separately and controllably withdrawing support liquid and sludge from said compartments at a rate which will permit the flow of water from said slude compartment through said partition and into said draw-off compartment.

2. The apparatus of claim 1, wherein said perforate partition is inclined from the vertical position towards said sludge compartment.

3. The apparatus of claim 1, wherein said support liquid is discharged through said second conduit means.

4. The apparatus of claim 1, wherein there is provided a differential sensing device arranged to actuate the sludge discharge means when the support liquid-sludge level in said compartments reaches a predetermined difference.

5. The apparatus of claim 1, wherein there is provided a plurality of liquid draw-off compartments interconnected by said second conduit means, for maintaining a common support liquid level in said compartments.

6. The apparatus of claim 1, wherein the perforate partition is a wire screen placed across the corners of the tank, each said enclosed corner comprising a liquid draw-off compartment.

7. The apparatus of claim 1, wherein the bottom of the draw-off compartment is below the bottom of the sludge compartment.

8. A process for thickening sludge which comprises; establishing a sludge settling zone and a liquid draw-off zone, separating said zones by a substantially vertical perforate partition, simultaneously supplying feed sludge and support liquid to their respective zones at a rate which will prevent said feed sludge from passing through said partition, allowing said sludge to settle, controllably withdrawing support liquid from said draw-off zone to create a level differential between said zones, maintaining said level differential to permit the flow of liquid from said sludge zone to said draw-off zone, and withdrawing thickened sludge from said sludge zone.

9. The process of claim 8, wherein the rate at which liquid passes from the sludge zone to the draw-off zone is proportional to the level differential maintained between said zones.

References Cited

UNITED STATES PATENTS

| 2,766,203 | 10/1956 | Brown et al. | 210—83 X |
| 2,920,763 | 1/1960 | Lind et al. | 210—320 X |
| 3,012,677 | 12/1961 | Hungate | 210—111 X |
| 3,385,439 | 5/1968 | Bach | 210—83 |

JAMES L. DE CESAR, Primary Examiner

U.S. Cl. X.R.

210—101, 114, 528